United States Patent
Tao et al.

(10) Patent No.: US 10,866,437 B2
(45) Date of Patent: Dec. 15, 2020

(54) USE OF CLASS OF QUATERNARY MOLYBDENUM/TUNGSTEN TELLURATE CRYSTALS, AND DEVICE

(71) Applicant: SHANDONG UNIVERSITY, Jinan (CN)

(72) Inventors: Xutang Tao, Jinan (CN); Zeliang Gao, Jinan (CN); Youxuan Sun, Jinan (CN); Qian Wu, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 179 days.

(21) Appl. No.: 16/313,033

(22) PCT Filed: Sep. 30, 2017

(86) PCT No.: PCT/CN2017/104968
§ 371 (c)(1),
(2) Date: Dec. 23, 2018

(87) PCT Pub. No.: WO2018/107876
PCT Pub. Date: Jun. 21, 2018

(65) Prior Publication Data
US 2019/0227349 A1    Jul. 25, 2019

(30) Foreign Application Priority Data
Dec. 15, 2016   (CN) .......................... 2016 1 1161381

(51) Int. Cl.
*G02F 1/00*    (2006.01)
*G02F 1/11*    (2006.01)
*H01S 3/117*   (2006.01)

(52) U.S. Cl.
CPC .............. *G02F 1/0072* (2013.01); *G02F 1/11* (2013.01); *H01S 3/117* (2013.01)

(58) Field of Classification Search
CPC .......... G02F 1/0072; G02F 1/11; H01S 3/117; H01S 3/1611; H01S 3/1643
USPC .................................................. 359/237, 321
See application file for complete search history.

(56) References Cited

PUBLICATIONS

A. Majchrowski, "β-BaTeMo2O9 microcrystals as promising optically operated materials", Apr. 30, 2013, Journal of Materials Science, p. 5939-5944.*

* cited by examiner

*Primary Examiner* — Tuyen Tra
(74) *Attorney, Agent, or Firm* — PROI Intellectual Property US; Klaus Michael Schmid

(57) ABSTRACT

The present disclosure relates to use of a quaternary molybdenum/tungsten tellurite crystal and a device thereof. The quaternary molybdenum/tungsten tellurite crystal is used as an acousto-optic material, wherein the quaternary molybdenum/tungsten tellurite comprises tellurium (Te) and tungsten (W), or tellurium (Te) and molybdenum (Mo). The crystal has abundant kinds, is non-toxic, and includes high, medium and low symmetry crystal systems; it easily produces a large-size and high-quality single crystal and almost meets all requirements of excellent acousto-optic properties. In the present disclosure, by selecting different light transmission directions and excitation source directions to fabricate an acousto-optic device with practical application values according to the requirements of the crystal acousto-optic device and the crystal characteristics, high-performance acousto-optic Q switching laser output is achieved.

5 Claims, 3 Drawing Sheets

USE OF CLASS OF QUATERNARY MOLYBDENUM/TUNGSTEN TELLURATE CRYSTALS, AND DEVICE

TECHNICAL FIELD

The present disclosure relates to the field of materials and optoelectronic functional devices, particularly relates to use of a quaternary molybdenum/tungsten tellurate crystal and a device of the same, and more particularly to use of the same for a high-performance acousto-optic device.

BACKGROUND OF THE RELATED ART

Acousto-optic effects were found as far back as the 1930s, in which most of the then used acousto-optic media were isotropic media such as water and glass, and this phenomenon is known as "ultrasonic grating". However, the acousto-optic effects had not received enough attention prior to the advent of laser because changes in frequencies and directions of light caused by the acousto-optic effects are relatively insignificant. Development of acousto-optic devices was driven by the emergence of laser in the 1960s. Due to good monochromaticity and directionality and high brightness of laser, as well as due to its capability of focusing, with coherent light it has, all energy of a laser beam to a spot of a diffraction-limited size, etc., the frequency, direction, and intensity of the laser beam can be quickly and effectively controlled using acousto-optic interaction, which greatly expands the range of applications of the laser, further promoting the development of acousto-optic devices. From the mid-1960s to the mid-1970s, the performance of acousto-optic devices has been improved rapidly with the advent of a collection of new high-performance acousto-optic crystals, such as $PbMoO_4$, $TeO_2$ and $LiNbO_3$. Moreover, irrespective of which aspect of characteristics of the laser beam is controlled, the working principles, structures and manufacturing processes of the acousto-optic devices in use are essentially the same, such that different needs (even multi-purposes for a same device) may be accommodated only by making certain adaptations in design, which cannot be achieved by other optoelectronic devices. Evolution of the optical waveguide and the surface acoustic wave technologies further advances the development of surface wave acousto-optic devices. Because the surface acoustic wave and the optical guide wave are concentrated in a thin layer with the medium surface thickness being an order of magnitude of wavelength, the energy is very concentrated, such that only a very small drive power is needed for the surface wave acousto-optic device. Meanwhile, the surface wave acousto-optic device is fabricated using a planar process which is relatively simple and flexible, so that it is easy to fabricate a transducer with a complex structure, and a bandwidth larger than a bulk wave device can be obtained. In recent years, the acousto-optic devices play an important role in the fields of optical fiber communication, laser addressing, laser marking, laser pulse, laser frequency stabilization, laser power stabilization, laser facsimile, laser printing, etc.

Typical acousto-optic materials are classified into three kinds: liquid, glass and single crystal. In liquid materials, water is considered as a better acousto-optic interaction medium; however, it has a larger acoustic attenuation and cannot maintain a stable optical performance as it is prone to be perturbed under the action of acoustic waves and heat, thereby having no significance of use. Glass ($SiO_2$) is one of the most common acousto-optic medium materials, but has a large acoustic attenuation, and its light transmissive wave band can hardly cover a mid-infrared wave band; meanwhile, a transparent glass with a refractive index greater than 2.1 can hardly be obtained in a visible spectrum region; further, glass has a small photoelastic coefficient, such that it is only suitable for acousto-optic devices with an audio frequency below 100 MHz. The early used acousto-optic crystals include $LiNbO_3$, $LiTaO_3$, $\alpha\text{-}Al_2O_3$, $R_3Al_5O_{12}$ and the like. However, all of these crystals have a poor acousto-optic performance.

At present, the most widely used acousto-optic crystals mainly comprise $TeO_2$ and $PbMoO_4$. $TeO_2$, which belongs to a tetragonal crystal system, is an acousto-optic material having a high quality factor, a high refractive index ($n_e$=2.430 and $n_o$=2.074), a high transparency to visible light, and a large photoelastic coefficient. Its shear wave is propagated at a slow acoustic velocity ($0.62\times10^5$ cm/s) in the [110] direction, and such slow shear wave has a high acousto-optic merit value ($M_2$=793×10$^{-18}$ s$^3$/g), and the transverse wave propagated in the direction at an angle of 35.9° relative to the X axis in the (001) plane has a zero temperature coefficient and a high merit value ($M_2$=200× 10$^{-18}$ s$^3$/g). Therefore, $TeO_2$ can be applied to anisotropic acousto-optic deflectors and filters that require a large bandwidth and a high resolution. However, the $TeO_2$ crystal growth technology is complex with a high growth cost; and it is difficult to obtain a high-quality bulk single crystal. $PbMoO_4$ also belongs to the tetragonal crystal system, which has a good optical property and a small acoustic attenuation coefficient. In addition, the c axis of $PbMoO_4$ coincides with its Y axis, so that the acousto-optic diffraction efficiency is unrelated to the polarization of incident light. Thus, the $PbMoO_4$ crystal is broadly applied to acousto-optic modulators and deflectors and may also be applied to high-resolution acousto-optic deflectors. However, this crystal contains a toxic element Pb and is difficult to be processed due to its smaller hardness (with the Mohs hardness about 3).

The Chinese patent CN1313517A (application No. 01112800.3) discloses an acousto-optic modulator fabricated by a lead tungstate crystal modified by rare earth ions. In this patent, by fabricating an acousto-optic modulator using $La^{3+}$: PWO or $Y^{3+}$: PWO instead of the PMO or $TeO_2$ crystal, the performance of the modulator is improved significantly without substantially changing the design and structure of the modulator; particularly, the working wave band of the modulator extends towards the near-ultraviolet region by 60-70 nm approximately and a good irradiation resistance is imparted. Although the performance of the PWO crystal acousto-optic device is improved in this patent, the problem that the crystal contains the toxic element Pb is not resolved yet.

The Chinese patent CN105068280A (application No. 201510425255.7) discloses uses of a potassium fluoroboratoberyllate (KBBF)-family crystal materials (including potassium fluoroboratoberyllate, rubidium fluoroboratoberyllate and cesium fluoroboratoberyllate) and an acousto-optic device. Uses of the KBBF-family crystal materials include: an acousto-optic medium in an acousto-optic device, wherein light incoming to the acousto-optic medium is ultraviolet light; the incoming direction of the acoustic wave generated by the acousto-optic device into the acousto-optic medium is c-axis direction of the KBBF-family crystals; and the incoming direction of the ultraviolet light into the acousto-optic medium is perpendicular to the c-axis direction. However, the KBBF-family crystals disclosed in this patent have certain difficulties in growing a large-size and high-quality single crystal. In addition, this kind of materials has a light transmissive wave band incapable of covering a mid-infrared wave band and has a poor acousto-optic effect, such that they can hardly be used in practice.

Development of laser technologies and lasers, particularly application of mid-infrared lasers, becomes highly demanding on comprehensive performance of the acousto-optic devices, particularly on the light transmissive wave band. High-performance acousto-optic materials are the basis of high-performance acousto-optic devices. Single-crystal materials are the preferred choice for the development of acousto-optic materials by virtue of their large quality factor $M_2$, low acoustic attenuation, and good light transparency characteristics. A good acousto-optic material not only requires a high acousto-optic interaction performance, but also a good optical and acoustic performance. In general, the acousto-optic interaction performance of a material is measured by its acousto-optic merit value (also referred to as the acousto-optic quality factor). Moreover, requirements of an acousto-optic device on the optical performance of a material are essentially the same as those of a common optical device, including: 1) high light transmittance and high refractive index within a light wavelength range in use; 2) high chemical stability, and long the mechanical life; 3) high photodamage threshold and ease of machining; 4) small temperature coefficients of respective physical constants; 5) having developed a crystal growth technology capable of obtaining a high-quality and large-size crystal, wherein the good acoustic properties of a material are expressed as low acoustic attenuation, small nonlinear acoustic coefficient, and small acoustic velocity temperature coefficient; and 6) containing heavy ions and high crystal density, etc.

In view of the above, under the existing acousto-optic principles, the characteristics of the acousto-optic materials determine the characteristics and range of applications of the acousto-optic devices. Therefore, it is a hot topic in current researches on materials and devices to explore the acousto-optic materials and devices thereof with excellent performance so as to meet the needs of scientific and technological development.

SUMMARY OF THE INVENTION

To overcome the drawbacks in the prior art, the present disclosure provides a use of a quaternary molybdenum/tungsten tellurite crystal and a device of the same.

The technical solution of the present disclosure is provided as follows:

Use of quaternary molybdenum/tungsten tellurite crystal as an acousto-optic material, wherein the quaternary molybdenum/tungsten tellurite is a tetraoxide comprising tellurium (Te) and tungsten (W), or tellurium (Te) and molybdenum (Mo).

According to the present disclosure, the quaternary molybdenum/tungsten tellurite is $\beta$-$BaTeMo_2O_9$, $\alpha$-$BaTeMo_2O_9$, $Cs_2TeMo_3O_{12}$, $Cs_2TeW_3O_{12}$, $Na_2TeW_2O_9$, $CdTeMoO_6$, etc., but is not limited to the above-listed materials.

According to the present disclosure, the quaternary molybdenum/tungsten tellurite crystal is used as an acousto-optic medium to fabricate an acousto-optic device, such as an acousto-optic modulator, an acousto-optic deflector, and an acousto-optic filter, etc.

The acousto-optic device comprises an acousto-optic medium, a piezoelectric transducer and an impedance matching network. The quaternary molybdenum/tungsten tellurite crystal serves as the acousto-optic medium.

The working principle of the present disclosure is provided as follows: as shown in FIG. 1, a radio frequency power signal generated by a driver is applied to the acousto-optic device; the piezoelectric transducer converts the radio frequency power signal to an ultrasonic signal to be transmitted in the acousto-optic medium to form a refractive index grating; when passing through the grating at a certain angle, a laser beam is diffracted due to acousto-optic interaction, wherein the Bragg diffraction angle $\theta_b = \lambda f/(2V)$, $\lambda$ representing a working wavelength, f representing a working frequency, and V representing a longitudinal wave acoustic velocity in the crystal.

According to the acousto-optic device provided by the present disclosure, choice of a light transmission direction of the acousto-optic medium is designed and optimized based on a photoelastic coefficient in crystal anisotropy and propagation characteristic of the light.

According to the acousto-optic device provided by the present disclosure, a direction of the piezoelectric transducer is arranged in consideration of the interaction between acoustic wave and the acousto-optic medium.

In the present disclosure, the quaternary molybdenum/tungsten tellurite crystal may be grown according to a conventional growth method in the art, and machined according to a conventional method such as cutting and polishing in the art after the growth is completed.

The acousto-optic device provided by the present disclosure may be assembled according to a conventional method in the art.

The present disclosure has the following advantageous effects.

In the present disclosure, a novel quaternary molybdenum/tungsten tellurium compound is used as the acousto-optic medium to fabricate a high-performance acousto-optic device. The material in use is non-toxic; and a high-quality and large-size single crystal can be obtained easily. The physical properties of the crystal almost meet all requirements of a high-quality acousto-optic material. Thus, the crystal has important potential application values. Noteworthily, the light transmissive wave band of this kind of materials can cover 3-5 μm wave bands. The abundant crystal structures of such material cover high, medium and low crystal systems, such that material selection can be made according to practical application requirements.

DETAILED DESCRIPTION OF THE INVENTION

The present disclosure will be described in detail below in conjunction with the embodiments and the drawings, but is not limited thereto.

Crystals described in the embodiments are all prepared according to the prior art.

Particularly, $\alpha$-BaTeMo$_2$O$_9$ crystal is prepared with reference to the Chinese patent CN102031563A; $\beta$-BaTeMo$_2$O$_9$ crystal is prepared with reference to the Chinese patent CN1958883A; Cs$_2$TeMo$_3$O$_{12}$ crystal is prepared with reference to the Chinese patent CN102011189A; Cs$_2$TeW$_3$O$_{12}$ crystal is prepared with reference to the Chinese patent CN104562204A; and Na$_2$TeW$_2$O$_9$ crystal is prepared with reference to Cryst. Growth Des. 10 (9), 4091-4095, 2010.

Embodiment 1: $\alpha$-BaTeMo$_2$O$_9$ Crystal

The $\alpha$-BaTeMo$_2$O$_9$ crystal belongs to a biaxial crystal, the orthorhombic system, and mm2 point group. The crystal has a light transmissive range of 0.38-5.53 μm and a transmittance of about 80%. The transmittance of the crystal after being coated is up to 99% above. The crystal displays a higher refractive index ($n_z$=2.42@0.4 μm). The $\alpha$-BaTeMo$_2$O$_9$ crystal has excellent physicochemical properties such as ease of growing large-size and high-quality single crystals; resistance to deliquescence and cleavage, moderate hardness (Mohs~4.7), ease of machining, and larger optical damage threshold, etc.

The acousto-optic device comprises an acousto-optic medium, a piezoelectric transducer and an impedance matching network. The $\alpha$-BaTeMo$_2$O$_9$ crystal is selected as the acousto-optic medium, and choice and optimization is based on the acousto-optic coefficient of the crystal and a light propagation characteristic in the crystal (in the present embodiment, the z-axis is selected as the direction for transmitting light and the x-axis is for applying the piezoelectric transducer). The crystal is polished in the light transmission direction and coated with an optical anti-reflection film @ 1064 nm. The acousto-optic device is encapsulated with an aluminum shell.

The driver comprises a signal generation and power amplification circuit. The working voltage is DC +24V. The "power output" end outputs a drive power and is connected to an optical modulator device via a high-frequency cable; and a modulation signal is input through an "input" end.

Figure 1:
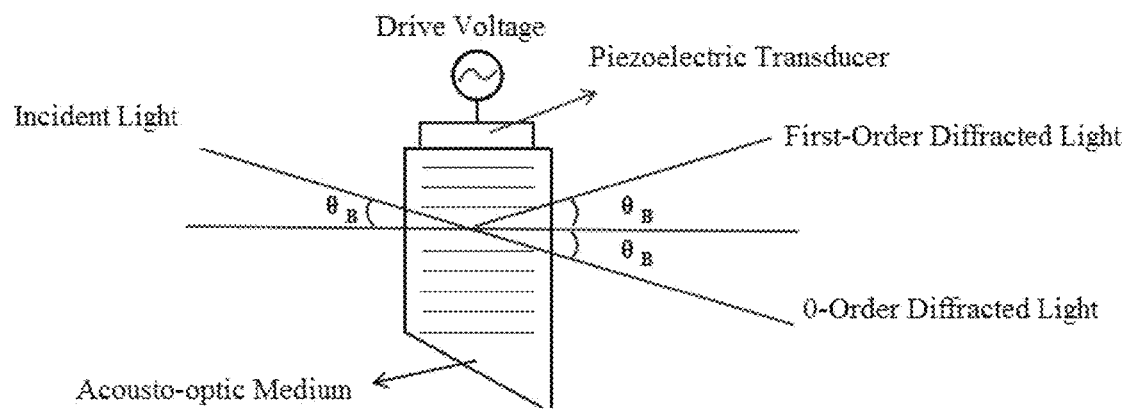
FIG. 1 is a schematic diagram of diffraction of an acousto-optic provided by the present disclosure.
Figure 2:
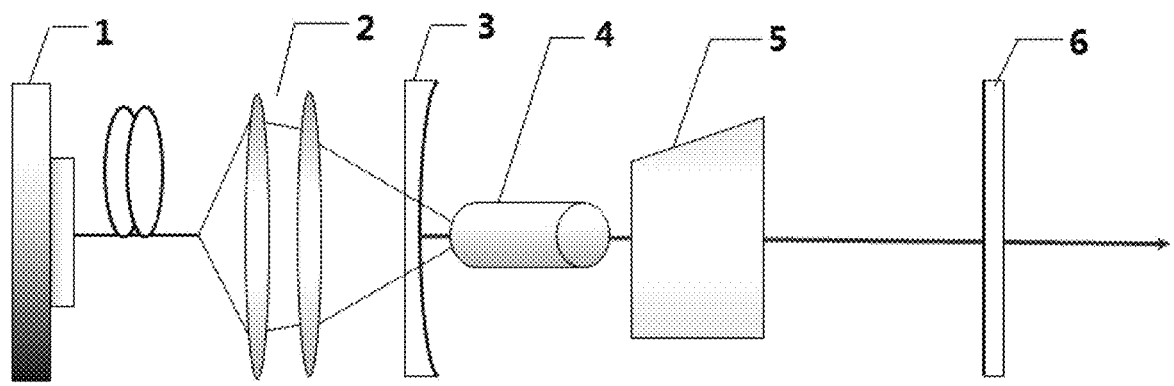
FIG. 2 is a Q switching optical path diagram of an acousto-optic device according to Embodiments 1-6 of the present disclosure, in which 1: pumping source, 2: focusing system, 3: input mirror, 4: laser crystal, 5: acousto-optic modulator, and 6: output mirror.
Figure 3:
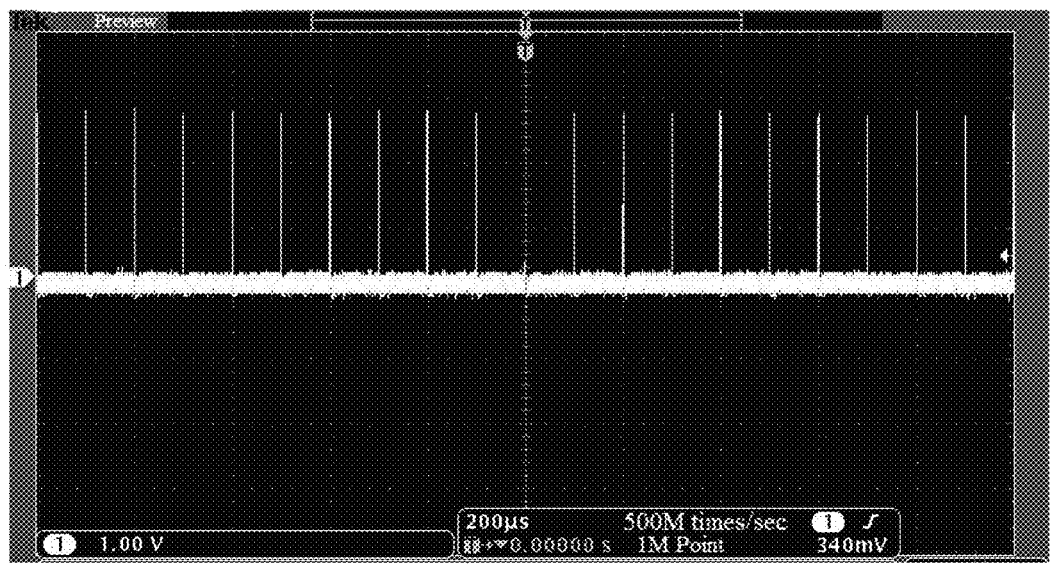
FIG. 3 is a Q switching laser output display diagram according to Embodiment 1 of the present disclosure.

If the acousto-optic device in this embodiment is applied to laser Q switching, a Q switching optical path diagram of the acousto-optic device is shown in FIG. 2. The Q switching optical path of the acousto-optic device comprises a pumping source 1, a focusing system 2, an input mirror 3, a laser crystal 4 (Nd:YAG), an acousto-optic modulator 5 and an output mirror 6, which are sequentially connected with one another. The acousto-optic medium of the acousto-optic modulator 5 is the $\alpha$-BaTeMo2O9 crystal. The acousto-optic device generates ultrasonic wave through electro-acoustic conversion, causing periodical change of a refractive index of the modulation medium, playing a role of diffraction grating to the incident light, which further causes diffraction loss of the incident light and decrease of the Q value, and consequently, laser oscillation cannot be formed. Under the excitation of an optical pump, upper state-reversed particle beams continuously accumulate till reaching a saturation value; and at this point, abrupt removal of an ultrasonic field will cause immediate loss of the diffraction effect and surging of the Q value in a cavity, and the laser oscillation recovers rapidly, outputting its energy in a giant pulse form, as shown in FIG. 3.

Embodiment 2: $\beta$-BaTeMo$_2$O$_9$ Crystal

The $\beta$-BaTeMo$_2$O$_9$ crystal belongs to a biaxial crystal, the monoclinic system, and the $2^{nd}$ point group. The crystal has a light transmissive range of 0.5-5 μm with a transmittance of about 80%. The transmittance of the crystal after being coated is up to 99% above. The crystal displays a higher refractive index ($n_z$=2.32@0.4 μm). Similarly, the $\beta$-BaTeMo$_2$O$_9$ crystal also has excellent physicochemical properties such as ease of growing large-size and high-quality single crystals; resistance to deliquescence and cleavage, moderate hardness (Mohs~4.7), ease of machining, and larger optical damage threshold, etc.

Figure 4:
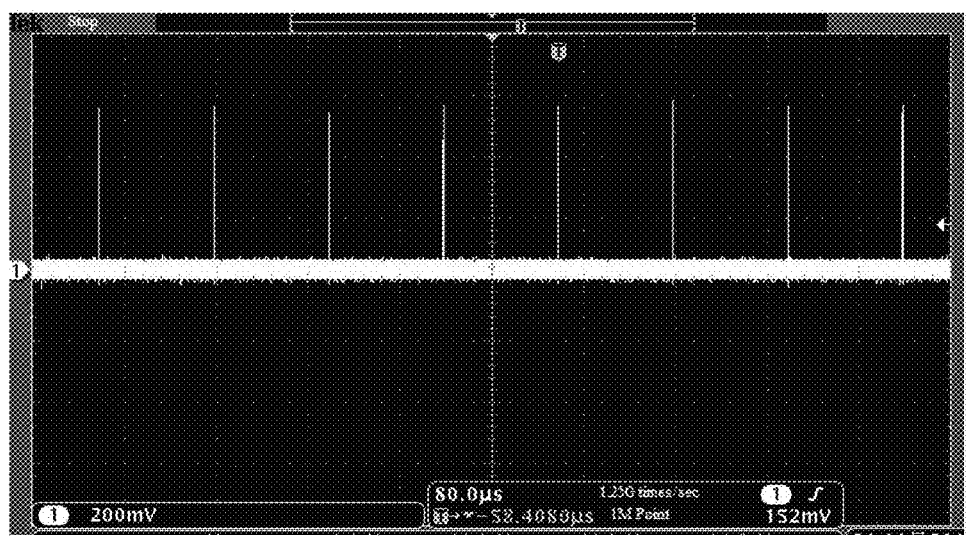
FIG. 4 is a Q switching laser output display diagram according to Embodiment 2 of the present disclosure.

The $\beta$-BaTeMo$_2$O$_9$ crystal acousto-optic device is similar to that in Embodiment 1, except that in this embodiment, the crystal orientation selects a crystal refractive index main axis, Z axis, as the light transmission direction of the acousto-optic device, and Y axis for applying the piezoelectric transducer. Likewise, as shown in FIG. 4, laser Q-switching can be output according to the laser optical path shown in FIG. 2.

Embodiment 3: Cs$_2$TeMo$_3$O$_{12}$ Crystal

The Cs$_2$TeMo$_3$O$_{12}$ crystal belongs to a uniaxial crystal, the hexagonal crystal system, and the $6^{th}$ point group. The crystal has a light transmissive range of 0.43-5.38 μm with a transmittance of about 80%. The transmittance of the crystal after being coated is up to 99% above. The crystal displays a higher refractive index ($n_e$=2.03@0.4 μm and $n_o$=2.23@0.48 μm). The Cs$_2$TeMo$_3$O$_{12}$ crystal has excellent physicochemical properties such as ease of growing large-size and high-quality single crystals; resistance to deliquescence and cleavage, moderate hardness (Mohs~4.7), ease of machining, and larger optical damage threshold, etc.

Figure 5:
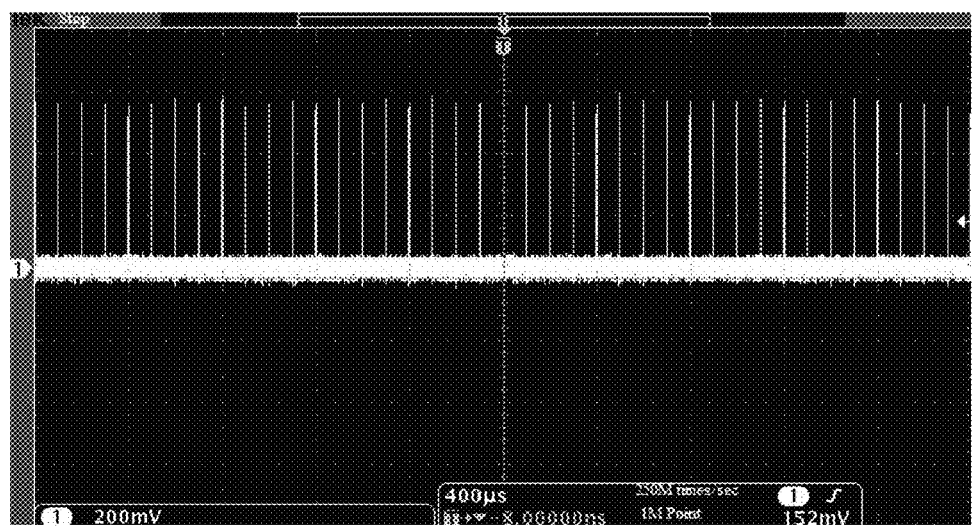
FIG. 5 is a Q switching laser output display diagram according to Embodiment 3 of the present disclosure.

The acousto-optic device of the Cs$_2$TeMo$_3$O$_{12}$ crystal is similar to that in Embodiment 1. In this embodiment, the crystal refractive index Z axis is selected as a light transmission direction of the crystal, and the refractive index X axis is for applying the transducer. Likewise, as shown in FIG. 5, laser Q-switching can be output according to the laser optical path shown in FIG. 2.

Embodiment 4: Cs$_2$TeW$_3$O$_{12}$ Crystal

The Cs$_2$TeW$_3$O$_{12}$ crystal belongs to a uniaxial crystal, the hexagonal crystal system, and the $6^{th}$ point group. The crystal has a light transmissive range of 0.41-5.31 μm with a transmittance of about 80%. The transmittance of the crystal after being coated is up to 99% above. The crystal has a higher refractive index ($n_e$=1.98@0.4 μm and $n_o$=2.20@0.48 μm). The Cs$_2$TeW$_3$O$_{12}$ crystal has excellent physicochemical properties such as ease of growing large-size and high-quality single crystals; resistance to deliquescence and cleavage, moderate hardness (Mohs~4.5), ease of machining, and larger optical damage threshold, etc.

Figure 6:
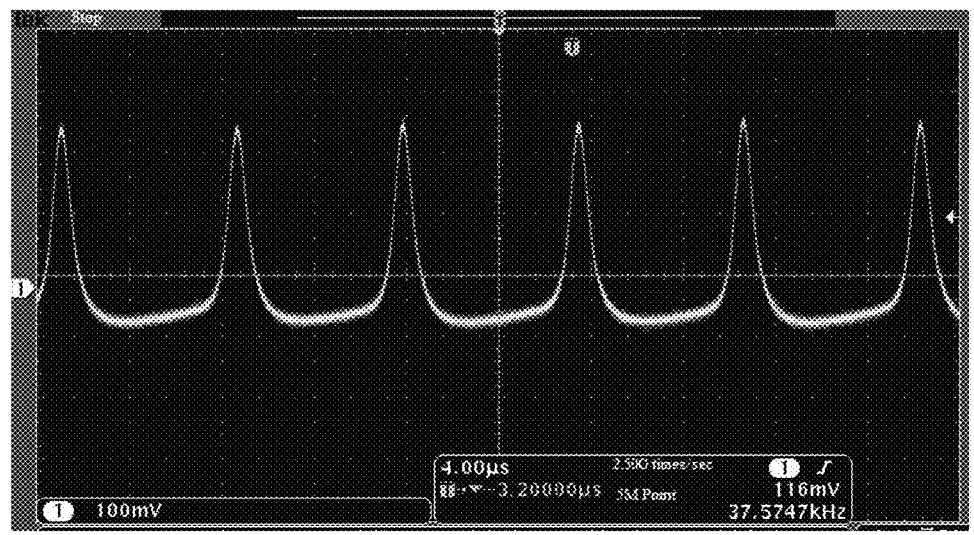
FIG. 6 is a Q switching laser output display diagram according to Embodiment 4 of the present disclosure.

The structure and properties of the Cs$_2$TeW$_3$O$_{12}$ crystal are similar to those of the Cs$_2$TeMo$_3$O$_{12}$ crystal. In this embodiment, a light transmission direction of the crystal is identical with that of the Cs$_2$TeMo$_3$O$_{12}$ crystal. Likewise, as shown in FIG. 6, laser Q-switching can be output according to the laser optical path shown in FIG. 2.

Embodiment 5: $CdTeMoO_6$ Crystal

The $CdTeMoO_6$ crystal belongs to a uniaxial crystal, a tetragonal crystal, and $-42\ m^{th}$ point group. The crystal has a light transmissive range of 0.345-5.40 μm with a transmittance of about 80%. The transmittance of the crystal after being coated is up to 99% above. The crystal has a higher refractive index. The $CdTeMoO_6$ crystal has excellent physicochemical properties such as ease of growing large-size and high-quality single crystals; resistance to deliquescence and cleavage, moderate hardness, ease of machining, good thermal stability and chemical stability, and larger optical damage threshold, etc.

Figure 7:
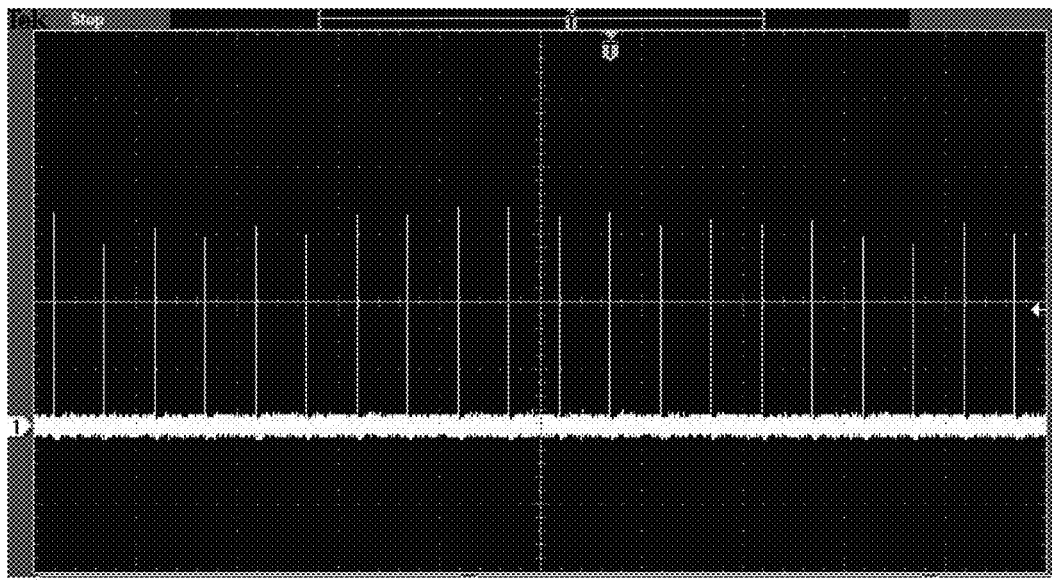
FIG. 7 is a Q switching laser output display diagram according to Embodiment 5 of the present disclosure.

The acousto-optic device of the $CdTeMoO_6$ crystal is similar to that in Embodiment 1. The crystal refractive index Z axis is selected as a light transmission direction of the crystal, and the refractive index X axis is for applying the transducer. Likewise, as shown in FIG. 7, laser Q-switching can be output according to the laser optical path shown in FIG. 2.

Embodiment 6: $Na_2TeW_2O_9$ Crystal

The $Na_2TeW_2O_9$ crystal belongs to biaxial crystal system, the monoclinic system, and the $m^{th}$ point group. The crystal has a light transmissive range of 0.45-5.0 μm with a transmittance of about 80%. The transmittance of the crystal after being coated is up to 99% above. The crystal has a higher refractive index, wherein $n_z=2.12@0.6$ μm. The $Na_2TeW_2O_9$ crystal has excellent physicochemical properties such as ease of growing large-size and high-quality single crystals; resistance to deliquescence and cleavage, moderate hardness, ease of machining, and larger optical damage threshold, etc.

Figure 8:
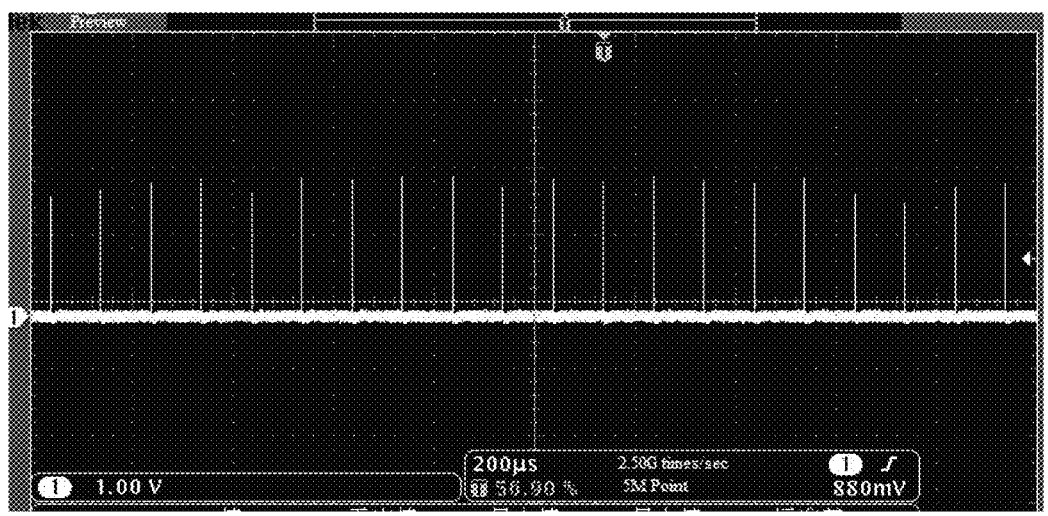
FIG. 8 is a Q switching laser output display diagram according to Embodiment 6 of the present disclosure.

The acousto-optic device of the $Na_2TeW_2O_9$ crystal is similar to that in Embodiment 1. The crystal refractive index Z axis is selected as a light transmission direction of the crystal, and the refractive index X axis is for applying the transducer. Likewise, as shown in FIG. 8, laser Q-switching can be output according to the laser optical path shown in FIG. 2.

Table 1 shows testing of the properties of the crystals in Embodiments 1-6, conventional fused silica and $TeO_2$.

TABLE 1

| Material | Density (g/cm3) | Length of Transmitted Wave (μm) | Diffraction Angle $\theta_B$ (° @1.064 μm) | Diffraction Efficiency |
|---|---|---|---|---|
| Fused Silica | 2.2 | 0.2-4.5 | | <85% |
| $TeO_2$ | 6.0 | 0.35-5.0 | 0.705 | ≤75% |
| $\alpha$-$BaTeMo_2O_9$ | 5.372 | 0.5-5.5 | 0.716 | 82% |
| $\beta$-$BaTeMo_2O_9$ | 5.477 | 0.5-5.0 | 0.66 | 75% |
| $Cs_2TeMo_3O_{12}$ | 5.004 | 0.43-5.38 | 0.68 | 70% |
| $Cs_2TeW_3O_{12}$ | 6.544 | 0.41-5.31 | 0.69 | 74% |
| $CdTeMoO_6$ | 5.66 | 0.345-5.4 | 0.67 | 73% |
| $Na_2TeW_2O_9$ | 6.076 | 0.45-5.0 | 0.682 | 72% |

It can be seen from Table 1 that the basic physical characteristics of the crystals provided by the present disclosure are close to the basic physical characteristic of the $TeO_2$ crystal, wherein the diffraction angle and the diffraction efficiency in the performance parameters of the $\alpha$-$BaTeMo_2O_9$ crystal acousto-optic device are slightly higher than those of the $TeO_2$ crystal acousto-optic device.

What is claimed is:

1. Use of quaternary molybdenum/tungsten tellurite crystal as an acousto-optic material wherein the quaternary molybdenum/tungsten tellurite is a tetraoxide comprising tellurium (Te) and tungsten (W), or tellurium (Te) and molybdenum (Mo), wherein the quaternary molybdenum/tungsten tellurite crystal is used as an acousto-optic medium to fabricate an acousto-optic device.

2. The use according to claim 1, wherein the acousto-optic device comprises an acousto-optic modulator, an acousto-optic deflector, and an acousto-optic filter.

3. The Use according to claim 1, wherein the quaternary molybdenum/tungsten tellurite is $\beta$-$BaTeMo_2O_9$, $\alpha$-$BaTeMo_2O_9$, $Cs_2TeMo_3O_{12}$, $Cs_2TeW_3O_{12}$, $Na_2TeW_2O_9$, or $CdTeMo_6$.

4. An acousto-optic device, comprising an acousto-optic medium, a piezoelectric transducer and an impedance matching network, wherein a quaternary molybdenum/tungsten tellurite crystal serves as the acousto-optic medium, wherein the quaternary molybdenum/tungsten tellurite is a tetraoxide comprising tellurium (Te) and tungsten (W), or tellurium (Te) and molybdenum (Mo).

5. The acousto-optic device according to claim 4, wherein the quaternary molybdenum/tungsten tellurite is $\beta$-$BaTeMo_2O_9$, $\alpha$-$BaTeMo_2O_9$, $Cs_2TeMo_3O_{12}$, $Cs_2TeW_3O_{12}$, $Na_2TeW_2O_9$, or $CdTeMo_6$.

\* \* \* \* \*